May 5, 1936.    H. L. BLACK    2,039,516
APPARATUS FOR INDICATING A NONOPERATIVE CONDITION OF VEHICLE LIGHTS
Filed March 25, 1933
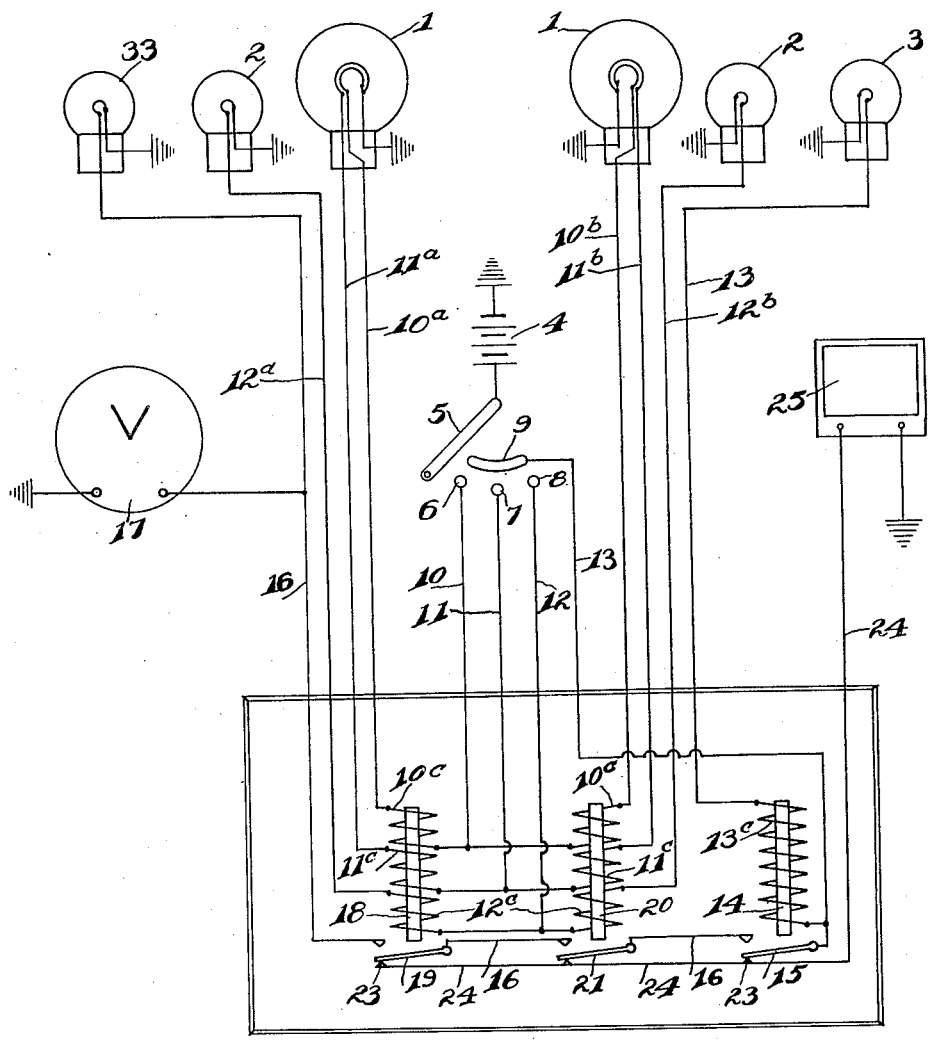
INVENTOR
H. L. Black
BY J. Edw. Maybee
ATTY Patented May 5, 1936

2,039,516

UNITED STATES PATENT OFFICE 2,039,516

APPARATUS FOR INDICATING A NONOPERATIVE CONDITION OF VEHICLE LIGHTS

Harry Lee Black, Toronto, Ontario, Canada, assignor of one-half to Arthur R. Fletcher, Toronto, Ontario, Canada Application March 25, 1933, Serial No. 662,749

5 Claims. (Cl. 177—311)

This invention relates more particularly to the lighting systems of motor vehicles in which two or more sets of lights are employed some of which are arranged in pairs of which both lights must be lit at the same time when conditions require, and my object is to provide means whereby a warning is actuated whenever any one of the lights in use at any given time becomes extinguished.

I attain my object by means of apparatus which may be briefly described as follows: In series in the circuit of the filament of each light is arranged electro-magnetic means controlling a circuit in which is included an electric warning device. As long as a lamp is lit the warning is in its normal condition, but when the warning circuit is broken by the failure of a light a warning is at once given.

In the preferred arrangement the warning circuit is normally closed and the warning signal is given by the breaking of the circuit.

Each vehicle light has independent control of the warning circuit, but the construction is simplified by employing, as the electro-magnetic controlling means, relays having a plurality of separate windings. By this expedient I am enabled to detect the condition of all the lights of a vehicle using pair of double headlights, a pair of cowl lights, and a tail light by the use of only three relays.

The invention is hereinafter more specifically described and is illustrated in the accompanying diagram which shows a complete lighting system as hereinbefore referred to.

In the drawing 1, 2 and 3 are electric light bulbs of the type in which their circuits are completed by ground connections. The lights 2 and 3 are of the single filament type, while the lights 1 are of the double filament type.

The battery 4 is grounded at one side and the other side is connected with the movable contact of a switch 5 which is the ordinary manually controllable switch controlling the vehicle lights. 6, 7, 8 and 9 are the fixed contacts of the switch, the contact 9 for the tail light or lights being, as usual, such that it is contacted by the movable contact of the switch when the latter is engaged with any one of the contacts 6, 7 or 8.

A conductor 10 is connected with the contact 6 and is formed with the branches 10ª and 10ᵇ leading respectively to similar filaments of the head lights 1. A conductor 11 is connected with the contact 7 and is formed with the branches 11ª and 11ᵇ leading respectively to the other filaments of the headlights 1. A conductor 12 is connected with the contact 8 and is formed with the branches 12ª and 12ᵇ leading respectively to the cowl lights 2.

A conductor 13 is connected with the contact 9 and leads to the tail light 3.

Included in the conductor 13 is the coil 13ᶜ of an electro-magnet 14.

The armature 15 of this electro-magnet is adapted to open and close the warning circuit 16 formed by the conductor 16. This conductor is connected to one side of the electric warning device 17, the other side of which is grounded and which is shown as a voltmeter, but which, of course, might be any other suitably electrically actuable warning, such as the lamp 33 which is connected to the warning circuit and is grounded.

Each branch conductor 10ª, 11ª and 12ª includes a coil, referenced respectively as 10ᶜ, 11ᶜ and 12ᶜ, and separately wound on an electro-magnet 18. The armature 19 of this electro-magnet is adapted to open and close the warning circuit 16.

Each branch conductor 10ᵇ, 11ᵇ, and 12ᵇ includes a similar coil, referenced also as 10ᶜ, 11ᶜ and 12ᶜ respectively, and separately wound on an electro-magnet 20.

The armature 21 of this electro-magnet is also adapted to open and close the warning circuit 16.

From the above it follows that, when the main switch closes the circuits of any pair of headlights, and thus also the tail light circuit 13, all the electro-magnets are energized and the warning circuit is closed. The voltmeter 17 or light 33 then indicates the passage of current and the driver knows all the lights supposed to be in use are functioning. If the circuit of any given lamp is broken, as, for example, by the breaking of its filament, the electro-magnet in its circuit becomes de-energized and the warning circuit is broken, which fact is at once indicated by the voltmeter and/or the indicating light.

It is desirable to give a positive warning indication as well as a negative when a light goes out and I therefore provide each of the armatures 15, 19, 21 with a back stop 23 connected in series with the conductor 24 which is connected to one side of a buzzer 25 which is suitably grounded.

When one pair of lights and the tail light are in use the warning circuit is closed by the armatures 15, 21 and 19.

If the tail light circuit is broken the armature 15 drops and completes a circuit from the battery through the conductors 13 and 16, through the contact 23 and conductor 24 to the buzzer 25.

If the circuit of any of the pair of lights in use is broken, the buzzer circuit is also completed and a positive warning given that a light is out.

From the above description it will be seen that I have devised a warning system which is very simple in construction and which may be readily connected with previously installed lighting systems.

What I claim as my invention is:

1. In a vehicle the combination of a plurality of pairs of electric lights; a tail light; a battery, one side of each light and the battery being grounded; a manual switch having a movable contact connected with the other side of the battery; a plurality of fixed contacts one for each pair of lights and a fixed tail light contact engageable by the movable contact when the latter is engaged with any one of the other fixed contacts; a conductor leading from the tail light contact to the tail light; an electro-magnet in series in said conductor; conductors extending from the other fixed contacts of the manual switch and branched to the respective lamps of each pair; two electro-magnets each having a plurality of separate windings corresponding in number to the number of pairs of lights, each branch conductor including a different one of said windings; a warning circuit tapped into the tail light conductor and connected to the battery therethrough; an electric warning device in said warning circuit grounded at one side; and switches in series in said warning circuit including movable switch members actuable by the aforesaid electro-magnets to close the said warning circuit when all the electro-magnets are energized.

2. In a vehicle the combination of a plurality of pairs of electric lights; a tail light; a battery, one side of each light and the battery being grounded; a manual switch having a movable contact connected with the other side of the battery; a plurality of fixed contacts one for each pair of lights and a fixed tail light contact engageable by the movable contact when the latter is engaged with any one of the other fixed contacts; a conductor leading from the tail light contact to the tail light; an electro-magnet in series in said conductor; conductors extending from the other fixed contacts of the manual switch and branched to the respective lamps of each pair; two electro-magnets each having a plurality of separate windings corresponding in number to the number of pairs of lights, each branch conductor including a different one of said windings; a warning circuit tapped into the tail light conductor and connected to the battery therethrough; an electric warning device in said warning circuit grounded at one side; switches in series in said warning circuit including movable switch members actuable by the aforesaid electro-magnets to close the said warning circuit when all the electro-magnets are energized; a grounded buzzer circuit; a buzzer in said circuit; and back contacts in series in the buzzer circuit engageable by the movable switch members when the electro-magnets are de-energized.

3. In combination with the lighting system of a motor vehicle having a plurality of lighting units, a plurality of filaments in each of said units, a filament of one unit corresponding with a filament in the other unit, a plurality of relay cores corresponding in number to the number of units, a plurality of windings on each of said cores corresponding in number to the number of filaments in each of said units, a source of current, circuits for connecting corresponding filaments in parallel with each filament in series with a corresponding relay coil, switch means for closing said parallel circuits one at a time, an armature for each of said relays, a pair of contacts controlled by each armature, and a proving device, said contacts being connected in an electric circuit including said proving device.

4. In a vehicle, the combination of a plurality of pairs of electric lights; a battery, one side of each light and the battery being grounded; a manual switch having a movable contact connected with the other side of the battery; a plurality of fixed contacts one for each pair of lights and engageable by the movable contact, and a fixed contact engageable by the movable contact when the latter is engaged with any one of the said plurality of fixed contacts; a warning circuit; a conductor leading from the second mentioned fixed contact adapted to supply current from the battery to the warning circuit when the movable contact is engaged with said fixed contact; an electric warning device in the said warning circuit grounded at one side; conductors extending from the other fixed contacts of the manual switch and branched to the respective lamps of each pair; two electro-magnets each having a plurality of separate windings corresponding in number to the number of pairs of lights, each branch conductor including a different one of said windings; and switches in series in the aforesaid warning circuit including movable switch members normally tending to move to the open position and formed as armatures attractable by the electro-magnets to close the said warning circuit when both the said electro-magnets are energized.

5. In a vehicle, the combination of a plurality of pairs of electric lights; a battery, one side of each light and the battery being grounded; a manual switch having a movable contact connected with the other side of the battery; a plurality of fixed contacts one for each pair of lights and engageable by the movable contact, and a fixed contact engageable by the movable contact when the latter is engaged with any one of the said plurality of fixed contacts; a warning circuit; a conductor leading from the second mentioned fixed contact adapted to supply current from the battery to the warning circuit when the movable contact is engaged with said fixed contact; an electric warning device in the said warning circuit grounded at one side; conductors extending from the other fixed contacts of the manual switch and branched to the respective lamps of each pair; two electro-magnets each having a plurality of separate windings corresponding in number to the number of pairs of lights, each branch conductor including a different one of said windings; switches in series in the aforesaid warning circuit including movable switch members normally tending to move to the open position and formed as armatures attractable by the electro-magnets to close the said warning circuit when both the said electro-magnets are energized; a grounded buzzer circuit; a buzzer in said circuit; and back contacts in series in the buzzer circuit engageable by the movable switch members when the electro-magnets are de-energized.

HARRY LEE BLACK.